United States Statutory Invention Registration [19]

[11] Reg. Number: H888

Chou et al. [43] Published: Feb. 5, 1991

[54] ORGANOPHOSPHORUS ESTER COMPOUNDS OF CYANOHYDRINS AS INSECTICIDES AND NEMATICIDES

[75] Inventors: David T. Chou; Gail S. Powell, both of Raleigh; Philip R. Timmons, Durham, all of N.C.

[73] Assignee: Rhone-Poulenc Ag Company, Research Triangle Park, N.C.

[21] Appl. No.: 324,225

[22] Filed: Mar. 15, 1989

[51] Int. Cl.[5] ..... C07F 9/40; A01N 57/02
[52] U.S. Cl. ..... 514/112
[58] Field of Search ..... 558/167; 514/112

[56] References Cited

U.S. PATENT DOCUMENTS

| | | | |
|---|---|---|---|
| 2,960,525 | 11/1960 | Dorken et al. | 558/167 |
| 2,965,533 | 12/1960 | Whetstone | 558/167 |
| 3,117,151 | 1/1964 | Blair | 558/167 |
| 3,876,666 | 4/1975 | Oswald et al. | 558/162 |
| 3,927,148 | 12/1975 | Oswald et al. | 558/162 |
| 4,496,493 | 1/1985 | Hodakowski et al. | 558/167 |
| 4,567,168 | 1/1986 | Kruger et al. | 514/89 |
| 4,780,458 | 10/1988 | Hodakowski et al. | 514/112 |

FOREIGN PATENT DOCUMENTS

| | | | |
|---|---|---|---|
| 0058864 | 9/1982 | European Pat. Off. | 558/167 |

OTHER PUBLICATIONS

Hall et al., "J. Am. Chem. Soc." vol. 79 No. 7 (1957) pp. 1768–1769.

*Primary Examiner*—Robert L. Stoll
*Assistant Examiner*—Joseph D. Anthony
*Attorney, Agent, or Firm*—Morgan & Finnegan

[57] ABSTRACT

Organophosphorus ester compounds of cyanohydrins of formula (I)

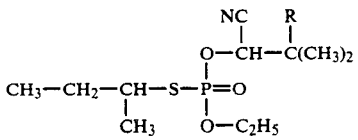

(I)

wherein R is a hydrogen atom or a methyl group, are useful as insecticides, nematicides or as both. The processes for their preparation, their compositions, and their methods of use are also described.

27 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORGANOPHOSPHORUS ESTER COMPOUNDS OF CYANOHYDRINS AS INSECTICIDES AND NEMATICIDES

BACKGROUND OF THE INVENTION

1. Field of the Invention

The present invention relates to new organophosphorus ester compounds of cyanohydrins, and processes for preparing the same. More particularly, the invention relates to the application of the compounds or compositions thereof in agriculture, especially as pesticides for controlling arthropods (preferably insects), nematodes or both.

2. Description of the Related Art

Certain organophosphorus compounds are known as insecticides and nematicides. For example, U.S. Pat. Nos. 4,496,493 and 4,780,458, incorporated herein by reference, disclose O-(2-methyl-1-cyanopropyl)-O-ethyl-S-n-propylthiophoshate and O-(2,2-dimethyl-1-cyanopropyl)-O-ethyl-S-n-propylthiophosphate for use as insecticides and nematicides. U.S. Pat. No. 4,567,168 discloses organophosphorate and organophosphonate compounds with similar utility.

SUMMARY OF THE INVENTION

The present invention pertains to organophosphorus compounds which exhibit outstanding pesticidal activity as insecticides or nematicides or both. Also covered are methods of preparation of the active compounds, compositions containing the same, and methods of use for the control of insects and nematodes.

The new compounds have the formula (I), including optical isomers thereof,

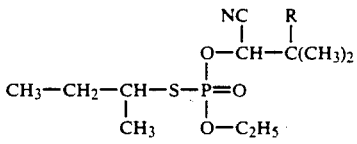

(I)

wherein R is a hydrogen atom or a methyl group.

Although compounds, especially organophosphates, have been found to be highly active as insecticides and/or nematicides, they have typically lacked sufficient soil residual (i.e., prolonged action or persistency) to permit their practical use. On the other hand, attempts to provide longer term residual compounds have also simultaneously produced products which can contaminate ground water because of their continued movement through the soil. The present invention thus provides compounds in which advantageously are combined the following preferred properties.

An object of the present invention is to provide new insecticides of the organophosphorus family, especially soil insecticides, having higher soil persistency and prolonged action.

Another object of the present invention is to provide compounds having high insect toxicity, for example, to insects in the Coleoptera family, particularly Diabrotica spp. (corn rootworm), and Diptera family, particularly *Musca domestica* (housefly).

Another object of the present invention is to provide compounds active against nematodes at every stage of their development, including eggs.

Another object of the invention is to provide compounds having both insecticidal and nematocidal activity.

A further object of the invention is to provide compounds having reduced vertical movement in soil so as to reduce the risk of ground water pollution.

An additional object of the invention is to provide compounds wherein the properties of high soil insecticidal and nematicidal activity, high soil persistence (residual), and reduced vertical soil movement (leaching) are combined within a single compound.

These and other objects of the invention shall become readily apparent from the detailed description of the present invention.

DESCRIPTION OF THE PREFERRED EMBODIMENTS

The compounds of the present invention are prepared from a cyanohydrin of formula (II)

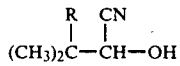

(II)

wherein R is H or $CH_3$, either in one step by reaction with a compound of formula (III)

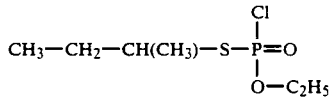

(III)

or in two steps by first reacting a compound of formula (IV)

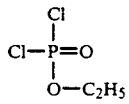

(IV)

with a compound of formula (II) to form an intermediate mono-chloridate compound and then reacting the intermediate product with a compound of formula (V)

$$CH_3—CH_2—CH(CH_3)—SM \quad (V)$$

wherein M is an alkali metal such as sodium or potassium.

In the one step process of preparation, the reactants are generally in a molar ratio between about 0.8 and about 1.25, preferably between about 0.9 and about 1.1, and more preferably in a stoichiometrically equivalent amount.

The reaction is usually conducted in an inert solvent preferably in the presence of an acid acceptor. An acid acceptor, for example, is a compound which is able to react with hydrogen chloride. Examples of acid acceptors are organic and inorganic bases. Examples of organic bases are liquid tertiary amines such as triethylamine, trimethylamine, pyridine, collidine, 4-(dimethylamino)pyridine, 1,4-diazobicyclo[2,2,2]octane, and the like. Examples of inorganic bases are the alkali metal or alkaline earth carbonates or hydroxides, especially sodium or potassium carbonates or hydroxides.

By an inert an solvent is meant a solvent which does not react with the reactants or reaction products. In general any organic solvent that is both inert to the reactants and stable under the reaction conditions may be employed. Illustrative of organic solvents which are generally suitable for use in the reactions of the invention are: saturated or unsaturated aliphatic hydrocarbons or aromatic hydrocarbons, such as alkanes, toluene or xylenes; cyclic or acyclic ethers such as dioxane, tetrahydrofuran or diethyl ether; and chlorinated aliphatic hydrocarbons such as chloroform, 1,1-dichloroethane, 1,2-dichloroethane, dichloromethane, carbon tetrachloride or the like.

The one-step process of preparation can be conducted over a broad temperature and pressure range to yield the desired products. Generally, the reaction temperature is between about −40° C. and about 120° C., preferably between about 10° C. and about 80° C. Atmospheric pressure or elevated pressures are preferred.

Likewise, the reaction conditions of the one-step process of preparation can also be used in each of the two steps of the two-step process of preparation. In this process the alkaline mercaptide, $CH_3—CH_2—CH(CH_3)—SM$, can be prepared by reaction of the corresponding butanethiol with a basic agent such as an alkali metal hydride in an inert solvent.

Finally, a third process of preparation can be used to make the compounds of the invention. According to this process, ethanol is reacted with $CH_3—CH_2—CH(CH_3)—S—POCl_2$ in the presence of $(CH_3)_2C(R)CHO$ (wherein R is a hydrogen atom or a methyl group) and MCN (a metallic cyanide, wherein M is an alkali metal such as sodium or potassium as previously defined). This one-step reaction can be achieved at a temperature within the range of about −10° C. to about 120° C. in an inert organic solvent as described herein. The presence of a phase transfer catalyst such as an organic ammonium salt may also be helpful.

The cyanohydrin reactant of formula (II) may be made by known methods. By the expression "known methods", it is meant methods which were heretofore used or described in the chemical literature.

From the pesticidal results and methods of use set forth herein, the present invention provides compounds which control a number of pest species including arthropods (especially insects) and plant nematodes. The compounds are thus advantageously employed in practical uses, for example, in agricultural and horticultural crops, forestry, veterinary medicine and livestock husbandry, and in public health.

A feature of the present invention therefore provides a method of control of pests, especially arthropods (preferably insects) and nematodes which comprises applying to plants, plant seeds, plant roots or the medium in which the plants, plant seeds or plant roots grow an effective amount of a compound of the invention.

The compounds of this invention are preferably used to control plant pathogenic nematodes, such as Root Knot, Cyst, Dagger, Lesion, and stem and bulb nematodes and soil insects such as corn rootworm, termites, (especially in structures), root maggots, wireworms, rootweevils, stalkborers, cutworms and grubs, but they may also control some insects which feed on the above ground portions of plants via foliar application or systemic action.

For soil nematode and soil insect (e.g. corn rootworm) control the application of the compounds is advantageously made by applying or incorporating into the soil in which plants are planted or are to be planted, or to seeds, or to growing plant roots. If it is desired to control only pests attacking the above ground portions of the plant, compounds claimed in this invention are highly active toward selected insects and may be suitably applied to such above ground portions of the plant.

Compounds of the invention may be used in agriculture, veterinary medicine, and public health to control many insects and mites. They are especially useful for the control of filth flies and other Dipteran pests, such as houseflies, stableflies, soldierflies, hornflies, deerflies, horseflies, and mosquitoes.

Compounds of the invention may be used in the following applications and on the following arthopod (especially insect) and nematode pests:

In the protection of stored products, for example cereals, including grain and flour, groundnuts, animal feedstuffs, timber and household goods, e.g. carpets and textiles, compounds of the invention are useful against attack by arthropods, more especially beetles, including weevils, moths and mites, for example Ephestia spp. (flour moths), Anthrenus spp. (carpet beetles), Tribolium spp. (flour beetles), Sitophilus spp. (grain weevils) and Acarus spp. (mites).

In the control of cockroaches, ants and termites and similar arthropod pests in infested domestic and industrial premises and in the control of mosquito larvae in waterways, wells, reservoirs or other running or standing water.

For the treatment of foundations, structures and soil in the prevention of the attack on buildings by termites, for example, Reticulitermes spp., Heterotermes spp., Coptotermes spp.

In agriculture, against adults, larvae and eggs of Lepidoptera (butterflies and moths) e.g. Heliothis spp. such as *Heliothis virescens* (tobacco budworm), *Heliothis armigera* and *Heliothis zea*, Spodoptera spp. such as *S. exempta*, *S. littoralis* (Egyptian cotton worm), *S. eridania* (southern army worm), *Mamestra configurata* (bertha army worm); Earias spp. e.g. *E. insulana* (Egyptian bollworm), Pectinophora spp. e.g. *Pectinophora gossypiella* (pink bollworm), Ostrinia spp. such as *O. nubilalis* (European cornborer), Trichoplusiani (cabbage looper), Pieris spp. (cabbage worms), Laphygma spp. (army worms), Agrotis and Amathes spp. (cutworms), Wiseana spp. (porina moth), Chilo spp. (rice stem borer) Tryporyza spp. Diatraea spp. (sugar cane borers and rice borers), *Sparganothis pilleriana* (grape berry moth), *Cydia pomonella* (codling moth), Archips spp. (fruit tree tortrix moth), *Plutella xylostella* (diamond back moth), *Bupalus piniarius*, *Cheimatobia brumata*, *Lithocolletis blancardella*, *Hyponomeuta padella*, *Plutella maculipennis*, *Malacosoma neustria*, *Euproctis chrysorrhoea*, Lymantria spp., *Bucculatrix thurberiella*, *Phyllocnistis citrella*, Euxoa spp., Felita spp., *Mamestra brassicae*, *Panolis flammea*, *Prodenia litura*, *Carpocapsa pomonella*, *Pyrausta nubilalis*, *Ephestia kuehniella*, *Galleria mellonella*, *Tineola bisselliella*, *Tinea pellionella*, *Hofmannophila pseudospretella*, *Cacoecia podana*, *Capua reticulana*, *Choristoneura fumiferana*, *Clysia ambiguellis*, *Homona magnanime* and *Tortix viridana*.

Against adults and larvae of Coleoptera (beetles) e.g. *Hypothenemus hampei* (coffee berry borer), Hylesinus spp. (bark beetles), *Anthonomus grandis* (cotton boll weevil), Acalymma spp. (cucumber beetles), Lema spp., Psylliodes spp., *Leptinotarsa decemlineata* (Colorado potato beetle), Diabrotica spp. (corn rootworms), Gonocephalum spp. (false wire worms), Agriotes spp. Limonius spp. (wireworms), Dermolepida, Popillia spp.

Heteronychus spp. (white grubs), *Phaedon cochleariae* (mustard beetles), *Lissorhoptrus oryzophilus* (rice water weevil), Meligethes spp. (pollen beetles), Ceutorhynchus spp., Rhynchophorus and Cosmopolites spp. (root weevils), *Anobium punctatum, Rhizopertha dominica, Bruchidius obtectus, Acanthoscelides obtectus, Hylotrupes bajulus, Agelastica alni, Phaedon cochleariae, Psylliodes chrysocephala, Epilachna varivestis,* Atomaria spp., *Oryzaephilus surinamensis,* Anthonomus spp., Sitophilus spp., *Otiorrhynchus sulcatus, Cosmoplites sordidus, Ceuthorrhynchus assimilis, Hypera postica,* Dermestes spp., Trogoderma spp., Anthrenus spp., Attagenus spp., Lyctus spp., *Maligethes aeneus,* Ptinus spp., *Niptus hololeucrus, Gibbium psylloides,* Tribolium spp., *Tenebrio molitor,* Conoderus spp., *Melolontha melolontha, Amphimallon solstitialis* and *Costelytra zealandica.*

Against Heteroptera (Hemiptera and Homoptera) e.g. Psylla spp., Bemisia spp., Trialeurodes spp., Aphis spp., Myzus spp., *Megoura viciae,* Phylloxera spp., Adelges spp., *Phorodon humuli* (hop damson aphid), Aeneolamia spp., Nephotettix spp. (rice leaf hoppers), Empoasca spp., Nilaparvata spp., Perkinsiella spp., Pyrilla spp., Aonidiella spp. (red scales), Coccus spp., Pseucoccus spp., Helopeltis spp. (mosquito bugs), Lygus spp., Dysdercus spp., Oxycarenus spp., Nezara spp., Eurygaster spp., Piesma quadrata, *Cimex lectularius, Rhodnius prolixus* and Triatoma spp., *Aspidiotus hederae, Acurodes brassicae, Brevicoryne brassicae, Cryptomyzus ribis, Doralis fabae, Doralis pomi, Eriosoma lanigerum, Hyalopterus arundinis, Macrosiphum avenae,* Myzus spp., *Phorodon humuli, Rhopalosiphum padi, Euscelis bilobatus, Nephotettix cincticeps, Lecanium corni, Saissetia aleae, Laodelphax striatellus.*

Against Hymenoptera e.g. Athalia spp. and Cephus spp. (saw flies), Atta spp. (leaf cutting ants), Diprion spp., Hopolocampa spp., Lasius spp., Monomorium spp., and Vespa spp.

Against Diptera e.g. Delia spp; (root maggots), Atherigona spp. and Chlorops spp.; Sarcophaga spp.; Musca spp., Phormia spp., Aedes spp., Anopheles app., Simulium spp., (shoot flies), Phytomyza spp. (leaf miners), Ceratitis spp. (fruit flies), Culex spp., *Drosophila melanogaster, Ceratitis capitata, Dacus oleae, Tipula paludosa, Calliphora erythrocephala,* Lucilia spp., Chrysomyia spp., Cuterebra spp., Gastrophilus spp., Hypobosca spp., Stomoxys spp., Oestrus spp., Hypoderma spp., Tabanus spp., Fannia spp., *Biblio hortulanus, Oscinella frit,* Phorbia spp. and *Pegomyia hyoscyani.*

Against Thysanoptera such as *Thrips tabaci* and *Hercinothrips femoralis.*

Against Orthoptera such as Locusta and Schistocerca spp., (locusts) and crickets e.g. Gryllus spp., and Acheta spp., for example, *Blatta orientalis, Periplaneta americana, Leucophaea maderae, Blatella germanica, Acheta domesticus,* Gryllotalpa spp., *Locusta migratoria migratorioides, Melanoplus differentialis* and *Schistocerca gregaria.*

Against Collembola e.g. Sminthurus spp. and Onychiurus spp. (springtails); Periplaneta spp. and Blattela spp. (roaches).

Against Isoptera e.g. Odontotermes spp., Reticulotermes spp., Captotermes spp. (termites).

Against Dermaptera e.g. Forficula spp. (earwigs).

Against arthropods of agricultural significance such as Acari (mites) e.g. Tetranychus spp.; Panonychus spp. and Bryobia spp. (spider mites), Eriophyes spp. (gall mites).

Against Thysanura, for example *Lepisma saccharia.*

Against Anoplura for example, *Phylloxera vastatrix,* Pemphigus spp., *Pediculus humanus corporis,* Haematopinus spp., and Linognathus spp.

Against Mallophaga, for example, Trichodectes spp. and Damalinea spp.

Against Siphonophtera, for example, *Xenopsylla cheopis* and Ceratophyllus spp.

Against other arthopods, such as Polyphagotarsonemus spp., Blaniulus spp. (millipedes), Scutigerella spp. (symphilids), Oniscus spp. (woodlice) and Triops spp. (crustacea).

Against Isoposa, for example, *Oniseus asellus, Armadillidium vulgare* and *Porcellio scaber.*

Against Chilopoda, for example *Geophilus carpophaugs* and Scutigera spex.

Against Arachnida, for example, *Scorpio maurus* and *Latrodectus mactans.*

Against nemotodes which attack plants and trees of importance to agriculture, forestry and horticulture either directly or by spreading bacterial, viral, mycoplasma or fungal diseases of the plants, root-knot nematodes such as Meloidogyne spp. (e.g. *M. incognita*); cyst nematodes such as Globodera spp. (e.g. *G. rostochiensis*); Heterodera spp. (e.g. *H. avenae*); Radopholus spp. (e.g. *R. similis*); lesion nematodes such as Pratylenchus spp. (e.g. *P. pratensis*); Belonolaimus spp. (e.g. *B. gracilis*); Tylenchulus spp. (e.g. *T. semipenetrans*); Rotylenchulus spp. (e.g. *R. reniformis*); Rotylenchus spp. (e.g. *R. robustus*); Helicotylenchus spp. (e.g. *H. multicinctus*); Hemicycliophora spp. (e.g. *H. gracilis*); Criconemoides spp. (e.g. *C. similis*); Trichodorus spp. (e.g. *T. primitivus*); dagger nematodes such as Xiphinema spp. (e.g. *X. diversicaudatum*), Longidorus spp. (e.g. *L. elongatus*); Hoplolaimus spp. (e.g. *H. coronatus*); Aphelenchoides spp. (e.g. *A. ritzema-bosi, A. besseyi*); stem and bulb eelworms such as Ditylenchus spp. (e.g. *D. dipsaci*).

The compounds of the present invention are generally not applied as technical preparations, but are typically applied as formulations of an effective amount of the active ingredient. Typical formulations include compositions of the active ingredient in combination with one or more agriculturally acceptable and compatible components such as: carriers or extenders, adjuvants, surface-active agents, and optionally other active ingredients. Suitable formulations include granules, powders or liquids, the choice varying with the type of pest and environmental factors present at the particular locus of infestation. Thus, the compounds may be formulated as granules of various sizes, dusts, wettable powders, emulsifiable concentrates, solutions, dispersions, controlled release compositions, and the like. A typical formulation may vary widely in the concentration of active ingredient depending upon the particular agent used, the additives and carriers, other active ingredients, and the desired mode of application.

With due consideration to these factors the active ingredient of a typical formulated composition may, for example, be suitably present in an effective amount of about 0.01% up to about 95% by weight, preferably about 0.1% up to about 90%. For the formulation, agriculturally acceptable and compatible carriers, diluents, adjuvants and other suitable active ingredients comprise the balance of the formulation. Compatible surface-active agents if employed in the formulation may be present at various concentrations, suitably in the range of about 1% to about 30% by weight of the formulated composition.

The formulation may be used as such or diluted to a desired use dilution with a diluent or carrier suitable for facilitating dispersion of the active ingredients. A suitable effective amount of the active ingredient in the use dilution may be in the range of about 0.005% to about 10% or more, preferably about 0.01% to about 10% by weight.

Many variations of sprays, dusts and controlled or slow release compositions of a type known in the art may be used by substituting or adding a pesticidal compound or compounds of this invention as active ingredient(s) into the compositions known or apparent to the art.

The insecticidal and/or nematicidal compounds of the present invention may be formulated and applied with other compatible active agents including nematicides, insecticides, acaricides, fungicides, plant growth regulators, herbicides, fertilizers, and the like.

In applying the compounds of the invention or compositions thereof, whether alone or with other agricultural chemicals, an effective insecticidal and/or nematicidal amount of the active ingredient must be applied. While the application rate will vary widely depending on the choice of compound, formulation, mode of application, plant species being protected, planting density and other like factors, a suitable use rate (amount) for agricultural crops may be in the range of about 0.1 to about 25 kg/ha. More preferrably, applications for insecticidal use are in the range of about 0.25 to about 5 kg/ha and for both insecticidal and nematicidal use are in the range of about 1 to about 15 kg/ha.

EXAMPLES 1-7

The following examples illustrate the manner and process of making and using the invention and are not to be construed as limiting the invention.

EXAMPLES 1 and 2 illustrate the synthesis and the physical properties of the compounds according to the invention. The remaining EXAMPLES 3 to 7 illustrate the insecticidal and nematocidal use application and properties of agrochemical compositions containing the compounds of the invention.

EXAMPLE 1

Preparation of O-(1-cyano-2-methylpropyl)-O-ethyl-S-(1-methylpropyl) thiophosphate (compound No 1)

A solution of isobutyraldehyde cyanohydrin (2.0 g, 20 mmole), triethylamine (2.43 g, 24 mmole), and a few crystals of 4-N,N-dimethylaminopyridine in methylene chloride (70 ml) was cooled in an ice bath under an inert atmosphere. To the above solution was added dropwise O-ethyl-S-sec-butyl chlorophosphate (4.8 g, 22 mmole). The resulting mixture was allowed to warm up to 20° C. and stirred overnight. The reaction mixture was washed successively with water (3×75 ml) and brine. The solution was then dried (sodium sulfate) and concentrated to yield a yellow oil. Purification of the oil by column chromatography using magnesium silicate and hexane/ethyl acetate (90:10 to 80:20) as eluent afforded a yellow oil (3.1 g, 55.5%; purity of 89.2%).

The NMR spectrum confirmed that the obtained compound (compound No. 1) is the compound of formula (I) wherein R=H. The NMR spectrum in deuterated chloroform showed: doublets at 5, 1.50, 1.18, 1.13, and 4.92 ppm; multiplets at 2.75 to 3.90 ppm and 0.8 to 2.70 ppm; and quartets at 4.35 and 4.20 ppm.

EXAMPLE 2

Preparation of O-(1-cyano-2,2-dimethylpropyl)-O-ethyl-S-(1-methylpropyl) thiophosphate (compound No 2)

A solution of trimethylacetaldehyde cyanohydrin (1.52 g, 13 mmole), triethylamine (1.8 g, 18 mmole), and a catalytic amount (0.1 g) of 4-N,N-dimethylaminopyridine in methylene chloride (50 ml) was cooled in an ice bath under an inert atmosphere. To the above solution was added dropwise O-ethyl-S-sec-butyl chlorophosphate (3.2 g, 15 mmole) in methylene chloride (10 ml) over a period of ten minutes. The resulting mixture was allowed to stir at room temperature overnight. The reaction mixture was washed successively with water, dried (sodium sulfate), and concentrated to yield an orange oil. Purification of the oil by column chromatography using magnesium silicate and hexane/ethyl acetate (85:15 to 80:20) as eluent afforded a yellow oil corresponding to a compound of formula (I), wherein R=$CH_3$ (compound No 2), the structure of which was confirmed by an NMR spectrum in deuterated chloroform which showed: singlets at 1.10, 4.8 and 4.6 ppm; quartets at 4.24 and 4.12 ppm; multiplets at 2.90 to 3.70 ppm and 0.75 to 2.25 ppm; and a doublet at 1.45 ppm.

INSECTICIDAL AND NEMATICIDAL USE EXAMPLES

In the following EXAMPLES 3 to 7, insecticide and nematicide tests were conducted comparing the invention compounds (No 1 and No 2) with compounds No 1′ and No 2′ which are homologs of compounds No 1 and No 2, respectively, wherein the S-sec-butyl substituents are replaced by S-n-propyl substituents.

EXAMPLE 3

Effect on southern corn rootworm in soil

A formulated composition of the active ingredient was prepared by adding the test compound to dimethylformamide (DMF) at the rate of 0.2 ml (189 mg) of DMF per 10 mg of compound. To this was added 0.4 ml (316 mg) of an acetone solution containing 0.8 mg of a 3:1 ratio of Triton X-172:Triton X-152 (respectively, mainly anionic and nonionic low foam emulsifiers which are each anhydrous blends of alkylaryl polyether alcohols with organic sulfonates). Water was then added to bring the total volume to 40 ml. The concentration of the compound was typically 250 ppm, but occasionally was higher or lower depending upon the amount of test compound used. Subsequent serial dilutions with water provided the final test concentrations.

Into a jar containing 60 g of sandy loam soil was added an aliquot of the test compound formulation (as appropriate for the final soil concentration of the test compound), 3.2 ml of water and five pregerminated corn seedlings. The jaw was shaken thoroughly to obtain an even distribution of the test formulation. Following this, twenty southern corn rootworm eggs (*Diabrotica u. howardi*) were placed into a cavity, which was made in the soil. Vermiculite (1 ml) and water (1.7 ml) were then added to this cavity. In a similar manner, an untreated control was prepared by application of the same size aliquot of a water-acetone-DMF-emulsifier solution, containing no test compound. Additionally, a treated control with a commercial technical compound, formulated in the same manner was used as a test standard. After 7 days, the living rootworm larvae were counted using a well known "Berlese" funnel extraction method.

The results were converted to percent mortalities which versus the test dosages were used to calculate lethal concentrations (in ppm) to provide 50, 90 and 100% mortality ($LC_{50}$, $LC_{90}$, and approximate $LC_{100}$). These LC data are set forth in TABLE 1.

TABLE 1

Lethal Soil Concentrations Of Test Compounds To Provide 50, 90 and 100% Mortality Of Southern Corn Rootworm

| Compound | Lethal Concentration, ppm | | |
|---|---|---|---|
| | $LC_{50}$ | $LC_{90}$ | $LC_{100}$ |
| No 1 | 0.10 | 0.16 | 0.18 |
| No 1' | 0.24 | 0.85 | >1.0 |
| No 2 | 0.09 | 0.28 | 0.36 |
| No 2' | 0.42 | 0.7 | >1.0 |

EXAMPLE 4

Effect on southern corn rootworm via soil leaching

Southern corn rootworm larvae were used to measure the movement of test compounds through a vertical soil column. Ideal soil insecticides exhibit good persistent (residual) control while providing limited movement through the soil. The test procedure was as follows below.

A formulated solution was prepared as in EXAMPLE 3, except that 10.72 mg of the active ingredient were put in 20 ml of solution. Ten ml of this solution was added to the top of a plastic leaching tube (6 cm in diameter and 35 cm in length, packed with sandy loam soil containing 8% water by weight) to achieve a 20 ppm concentration in the top 7.7 cm of soil in the tube.

An automatic drip system applied 125 ml of water (simulated rainfall) over a period of 5 hours. The water and test compound were allowed to percolate through the soil over a 24 hours period. The soil column was subdivided into ten 2.5 cm soil increments. To alternate soil sections were added five southern corn rootworm larvae. After 2 days at 27° C. and 50% relative humidity, the living larvae were counted as in EXAMPLE 3. Mortality, which reflects the soil mobility of the compound, was determined for each soil increment. A calculation was made to determine the depth at which an $LC_{50}$ dose (lethal concentration in ppm killing 50% of larvae) occurs for each compound.

The results, set forth in TABLE 2, provide a soil concentration, which is equal to the $LC_{50}$ dose (in ppm) for the test compound at a specific soil depth (in cm). As shown, compounds No 1 and No 2 have lower $LC_{50}$ doses than compounds No 1' and No 2', respectively. Therefore, compounds No 1 and No 2 are clearly far less mobile than compounds No 1' and No 2', respectively.

TABLE 2

Soil Concentration At A Specific Soil Depth Resulting From Leaching Of The Test Compound

| Compound | Soil Depth, cm | Approx. Soil Conc., ppm |
|---|---|---|
| No 1 | 18-20 | 0.10 |
| No 1' | 18-20 | 0.24 |
| No 2 | 18-20 | 0.09 |
| No 2' | 18-20 | 0.42 |

EXAMPLE 5

Southern corn rootworm soil persistency test

Southern corn rootworm larvae were used to measure the soil persistency (residual activity) of test compounds. Ideal soil insecticides must persist long enough under field conditions to control corn rootworm egg hatching and larval feeding over approximately 2-3 months.

The method of preparation and testing of the formulated solutions are identical to that described in EXAMPLE 3. However, the volume of soil prepared in EXAMPLE 3 is sufficient for only a single test sample. As a result, additional volumes of soil were prepared at the beginning of this test for each anticipated test sample. The results of southern corn rootworm larvae mortality (in %) vs weeks after application, i.e., persistence of the test compound (each at 0.75 ppm soil concentration), are set forth in TABLE 3.

TABLE 3

Duration Of Soil Persistance Of Test Compounds For Control Of Southern Corn Rootworm

| Compound | Mortality, % Week | | | | | |
|---|---|---|---|---|---|---|
| | 0 | 4 | 8 | 12 | 16 | 20 |
| No 1 | 100 | 98 | 95 | 80 | 68 | — |
| No 1' | 97 | 5 | — | — | — | — |
| No 2 | 100 | 100 | 100 | 95 | 100 | 89 |
| No 2' | 93 | 45 | — | — | — | — |

EXAMPLE 6

Nematicidal use on Root knot nematode

A replicated field experiment was conducted. A sandy loam soil field, infested with root knot nematodes (*Meloidogyne incognita*), was planted with a melon crop. Applications of the formulated compositions of the active ingredients (a.i.), at 5, 10 and 15 kg a.i./ha, were made just before crop planting and the efficacy evaluation for nematode control was made 11 weeks later. The evaluation was made by visual estimation of gall proliferation in the roots. The rating scale is from 0 (no galls) to 10 (full of galls). The untreated control had a root gall rating of 6.4. Compounds No 1 and No 2 were included in this test along with commercial nematicide compounds: Ethoprophos (MOCAP) and Phenamiphos (NEMACUR). The results are set forth in TABLE 4.

TABLE 4

Root Gall Ratings In a Field Test Evaluation For Root-knot Nematode Control

| Compound | Root Gall Rating Soil Rate, kg a.i./ha | | |
|---|---|---|---|
| | 5 | 10 | 15 |
| No 1 | 4.6 | 3.2 | 2.7 |
| No 2 | 4.5 | 3.7 | 2.8 |
| Ethoprophos | — | 5.1 | 3.4 |
| Phenamiphos | — | 3.4 | 3.2 |

EXAMPLE 7

Use of invention compounds on house fly

For tests with compounds No 1 and No 2, suspensions of the test compounds were prepared by dissolving 10 mg of the compound in 0.1 ml of dimethylformamide, 4.9 ml of acetone, containing 0.25% by weight of Triton 172:Triton 152 (3:1 ratio), and 95 ml of water, containing 10% by weight of sucrose, to give 100 ml of a 100 ppm suspension. Aliquots of this were serially diluted into water, containing 5% by volume of the acetone and surfactant mixture mentioned above and 10% by weight of sucrose, to obtain appropriate test concentration dilutions.

For tests with compounds No 1′ and No 2′, a suspension of the test compound was prepared by dissolving 50 mg of the compound in 0.5 ml of dimethylformamide, 4.5 ml of acetone containing 0.25% by weight of Triton 172:Triton 152 (3:1 ratio), and 95 ml of water, containing 10% by weight of sucrose, to give 100 ml of a 500 ppm suspension. Aliquots of this were serially diluted into water, containing 50% by volume of the acetone and surfactant mixture mentioned above and 10% by weight of sucrose, to obtain appropriate test concentration dilutions.

Four to six day old adult house flies (*Musca domestica*) were reared according to the specifications of the Chemical Specialities Manufacturing Association (Blue Book, McNair-Dorland Co. N.Y. 1954; pages 243–244, 261) under controlled conditions. The flies were immobilized by anesthetizing with carbon dioxide and twenty five immobilized individuals, males and females, were transferred to a cage consisting of a standard food strainer inverted over a wrapping-paper-covered surface. Ten ml of the 100 ppm test compound formulation were added to a soufflé cup containing an absorbent cotton pad. As an untreated control, 10 ml of a water-acetone-DMF-emulsifier-sucrose solution, containing no test compound, were applied in a similar manner. A treated control with a commercial technical compound, malathion, formulated in the same manner, was tested as a standard. The bait cup was introduced inside the food strainer prior to admitting the anesthetized flies. After 24 hours, flies which showed no sign of movement on prodding were considered dead.

The results were converted to percent mortalities which versus the test dosages were used to calculate an $LC_{50}$ (a lethal concentration to provide 50% mortality). These $LC_{50}$ data are set forth in TABLE 5.

TABLE 5

| Lethal Concentration($LC_{50}$) Of Test Compounds On Housefly | |
|---|---|
| Compound | $LC_{50}$, ppm |
| No 1 | 7 |
| No 1′ | 51 |
| No 2 | 4 |
| No 2′ | >500 |

While the present invention has been set forth in specific and illustrative detail and described with preferred embodiments, it is susceptible to changes, modifications and alterations, obvious to one of ordinary skill in the art, without departing from the scope and spirit of the invention, which is defined by the claims appended hereto.

What we claim is:

1. An organophosphorus compound of formula (I)

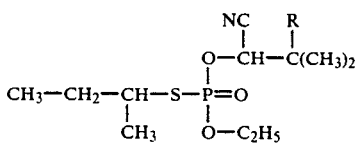

(I)

wherein R is a hydrogen atom or a methyl group.

2. The organophosphorus compound according to claim 1 wherein R is a hydrogen atom.

3. The organophosphorus compound according to claim 1 wherein R is a methyl group.

4. A process of preparation of a compound formula (I)

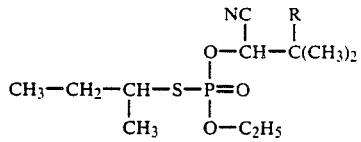

(I)

wherein R is a hydrogen atom or a methyl group, comprising the step of:

reacting a cyanohydrin of formula (II)

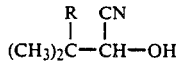

(II)

wherein R is H or $CH_3$, with a compound of formula (III)

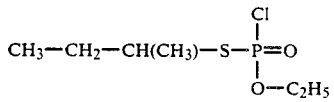

(III)

5. The process according to claim 4 wherein the reactants are in a molar ratio between about 0.8 and about 1.25.

6. The process according to claim 5 wherein the molar ratio is between about 0.9 and about 1.1.

7. A process of preparation of a compound of formula (I)

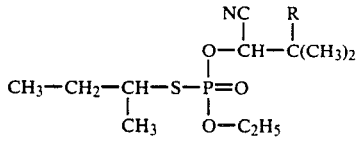

(I)

wherein R is a hydrogen atom or a methyl group, comprising the steps of:

reacting a cyanohydrin of formula (II)

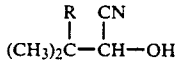

(II)

wherein R is H or $CH_3$, with a compound of formula (IV)

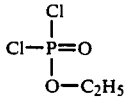

(IV)

to form an intermediate mono-chloridate compound; and then reacting the intermediate compound with $CH_3—CH_2—CH(CH_3)—SM$, wherein M is an alkali metal selected from sodium or potassium.

8. A method for the control of insects, nematodes or both which comprises applying to plants, plant seeds, plant roots or the medium in which the plants, plant seeds or plant roots grow an effective amount of a compound of formula (I)

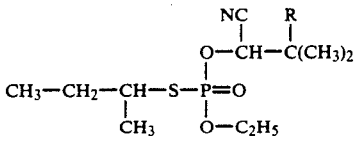

(I)

wherein R is a hydrogen atom or a methyl group.

9. The method according to claim 8 wherein the control of insects, nematodes or both is in soil by application of the effective amount of said compound.

10. The method according to claim 9 wherein the application of said compound comprises applying or incorporating said compound into the soil in which the plants are planted or are to be planted, or to the plant seeds or to the plant roots.

11. The method according to claim 10 wherein said insects are soil insects of the Diabrotica species and nematodes are soil nematodes infesting plants.

12. The method according to claim 8 wherein the effective amount of said compound is in the range of about 0.1 to about 25 kg/ha.

13. The method according to claim 9 wherein the effective amount of said compound is in the range of about 0.1 to about 25 kg/ha.

14. The method according to claim 10 wherein the effective amount of said compound is in the range of about 0.1 to about 25 kg/ha.

15. The method according to claim 11 wherein the effective amount of said compound is in the range of about 0.1 to about 25 kg/ha.

16. The method according to claim 12 wherein the effective amount of said compound is in the range of about 1 to about 15 kg/ha.

17. The method according to claim 13 wherein the effective amount of said compound is in the range of about 1 to about 15 kg/ha.

18. The method according to claim 14 wherein the effective amount of said compound is in the range of about 1 to about 15 kg/ha.

19. The method according to claim 15 where the effective amount of said compound is in the range of about 1 to about 15 kg/ha.

20. A method for the control of insects and mites in public health use comprising application of an effective amount of a compound of formula (I)

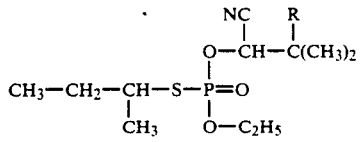

(I)

wherein R is a hydrogen atom or a methyl group.

21. The method of control of insects according to claim 20 wherein said insects are fly species in the Diptera family.

22. A nematicidal, an insecticidal or both a nematicidal and an insecticidal composition which comprises an effective amount of a compound of formula (I)

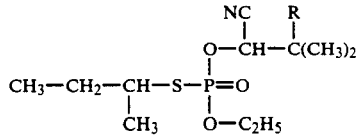

(I)

wherein R is a hydrogen atom or a methyl group, in combination with one or more agriculturally acceptable and compatible adjuvants, carriers, extenders or surface-active agents, and with or without other active ingredients.

23. The composition according to claim 22 wherein the effective amount of the compound of formula (I) is from about 0.01% to about 95% by weight.

24. The composition according to claim 23 wherein the effective amount is from about 0.1% to about 90% by weight.

25. The composition according to claim 22, which comprises one or more surface-active agents in the range of about 1% to about 30% by weight of the composition.

26. The composition according to claim 23, which comprises one or more surface-active agents in the range of about 1% to about 30% by weight of the composition.

27. The composition according to claim 24, which comprises one or more surface-active agents in the range of about 1% to about 30% by weight of the composition.

* * * * *